Oct. 21, 1941.　　R. R. CHAPPELL ET AL　　2,259,615
WIND VELOCITY INDICATOR
Original Filed Nov. 16, 1938　　2 Sheets-Sheet 2
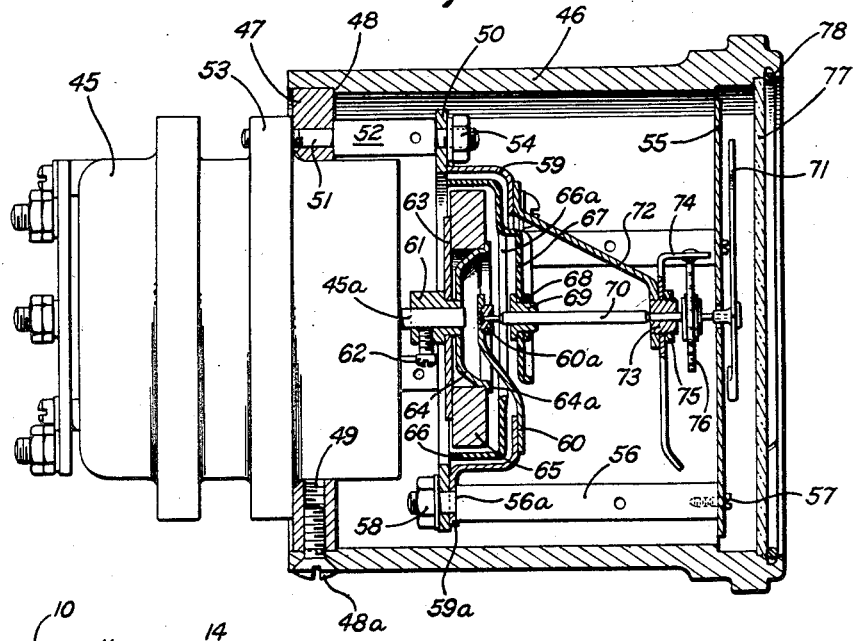
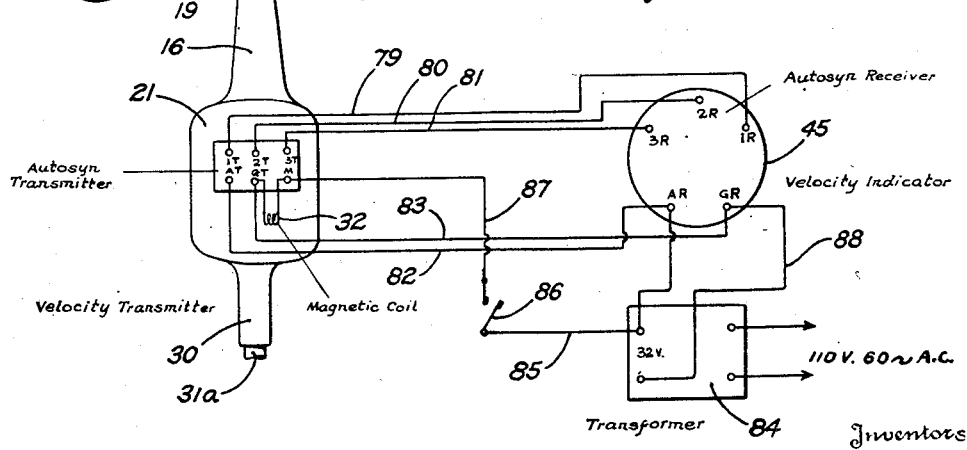
Inventors
Ralph R. Chappell
Rutger B. Colt
By Stephen Cerstvik
Attorney Patented Oct. 21, 1941

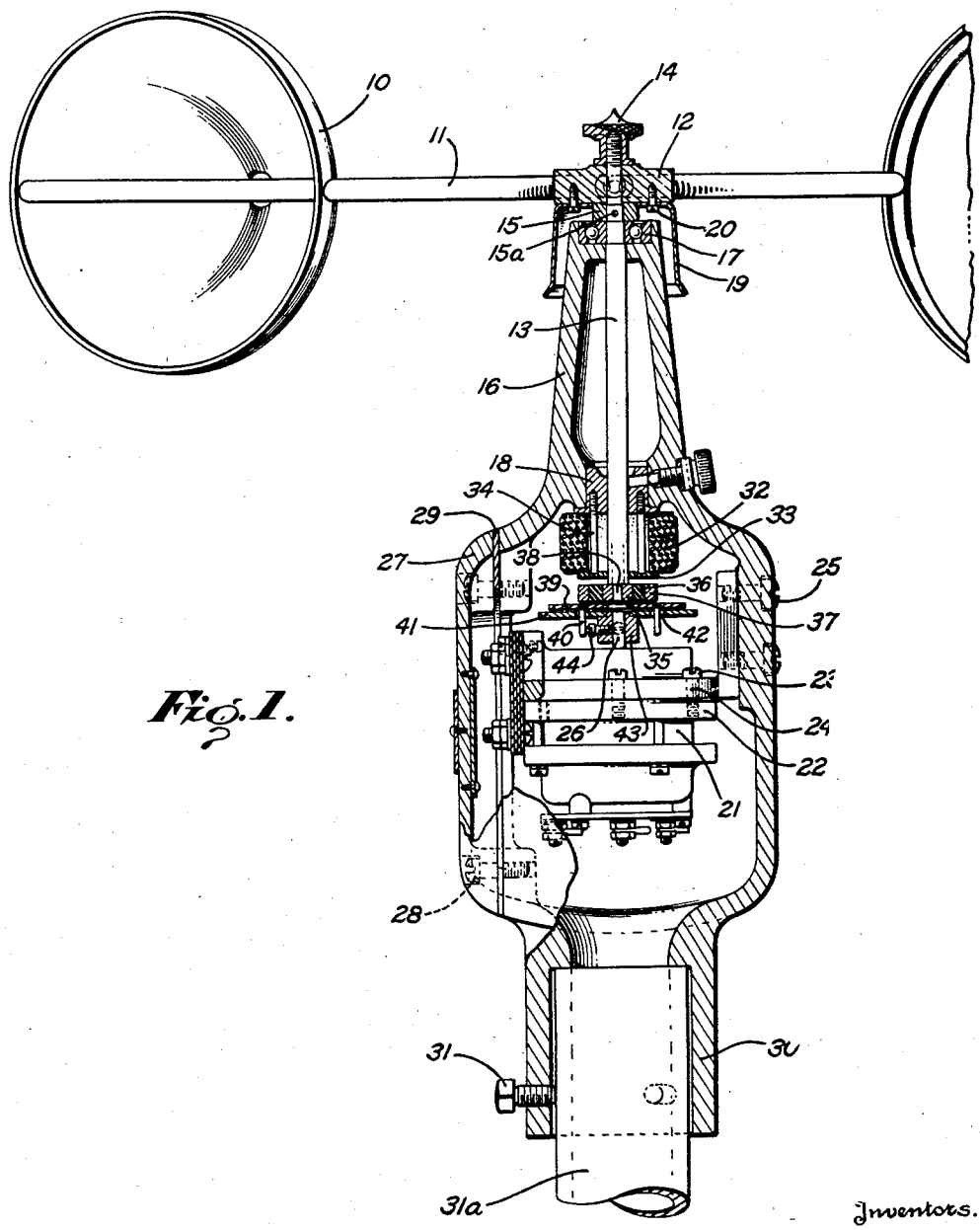

2,259,615

UNITED STATES PATENT OFFICE 2,259,615

WIND VELOCITY INDICATOR

Ralph R. Chappell, Richmond, Va., and Rutger B. Colt, Baltimore, Md., assignors to Bendix Aviation Corporation, South Bend, Ind., a corporation of Delaware Original application November 16, 1938, Serial No. 240,828. Divided and this application October 20, 1939, Serial No. 300,468

3 Claims. (Cl. 73—187)

The present invention relates to precision instruments and more particularly to mechanisms for measuring and transmitting indications of wind intensities or velocities, and is a division of copending application, Serial No. 240,828, filed November 16, 1938.

The invention embodies a novel system wherein parts of the system can be disconnected when an indication of the wind velocity is not desired and wherein the parts are brought into operating condition promptly as soon as the disconnected parts are reconnected into the system.

In similar devices of the prior art wherein the rotating element of a wind velocity measuring device was utilized in conjunction with self-synchronous devices such as "Autosyn" motors for transmitting an indication of wind velocity to a remote point, the rotor of the "Autosyn" transmitter was originally connected to the rotating element of the wind velocity device and the remote "Autosyn" receiver was connected to the indicator by suitable means for changing continuous rotation to a relatively stationary indication. When no reading was desired the "Autosyns" were de-energized so that only the transmitter rotor was rotated. When a reading was desired at the remote indicator, the "Autosyns" were re-energized but the rotor of the receiving "Autosyn" would not assume "in-step" position with the rotor of the "Autosyn" transmitter, but would merely oscillate and chatter whenever the speed of rotation of the rotor of the "Autosyn" transmitter was above a certain value. It was only at a very low wind velocity that the remote "Autosyn" receiver could, without the use of other devices, be brought up to speed and then utilized to produce a remote indication of the wind velocity.

Further, in devices of the prior art, various complicated timing devices and mechanical interconnecting systems were utilized to convert the continuous rotation of the rotating cup shaft into a relatively stationary indication of a pointer for indicating the relative velocity.

The novel arrangement of the present invention provides a simple and effective means for converting the continuous rotation of the anemometer cup shaft into a relatively stationary pointer indication of the wind velocity.

One of the objects of the present invention is to provide a novel wind velocity measuring and indicating system whereby the foregoing undesirable characteristics are eliminated.

Another object is to provide a novel wind velocity measuring system comprising a rotating anemometer shaft, a self-synchronous transmitter, a self-synchronous receiver electrically connected to said transmitter, and magnetic clutch means for connecting said shaft and said transmitter, whereby said receiver and transmitter are retained in synchronism.

The above and further objects and advantages of the invention will appear more fully hereinafter from a consideration of the detailed description which follows, taken together with the accompanying drawings wherein is illustrated one embodiment of the invention. It is to be expressly understood, however, that the drawings are for purposes of illustration and description only, and are not designed as a definition of the limits of the invention, reference being primarily had for this purpose to the appended claims.

In the drawings wherein like reference characters refer to like parts throughout the several views:

Fig. 1 is a side elevation, in section, illustrating one form of the transmitting end of the novel wind velocity measuring and indicating system;

Fig. 2 is a side elevation, in section illustrating one form of the receiving end of the novel system; and Fig. 3 is a diagrammatic view of the complete novel system embodying the present invention.

In the drawings, the invention is illustrated as applied to a wind-cup type anemometer, although it is to be expressly understood that any type of rotating anemometer may be utilized.

Referring to the drawings and more particularly to Fig. 1, a plurality of cups 10 are mounted on arms 11 extending radially from the hub 12 which is secured to a shaft or spindle 13 between a screw cap 14 and a collar 15 fastened to said shaft by pin 15a, said cups being designed to rotate said spindle at a speed bearing a known proportion to the velocity of the wind impinging thereon. Spindle 13 is mounted concentrically with a housing 16 and is rotatably supported thereby by thrust ball-bearing 17 and is guided by a guide bearing formed in the bushing 18. A skirt or shield 19 is secured to hub 12 by means of screws 20 and serves to prevent entrance of dust or moisture into the thrust bearing.

A casing 21 is mounted by means of the circular rim 22 thereof and screws 23 upon a ring-shaped member 24 fastened to the housing 16 at an extension thereof by bolts 25. The rotor and stator of a well-known self-synchronous device such as an "Autosyn" motor transmitter are mounted within the casing 21 with the shaft 26 of the rotor of said "Autosyn" transmitter extending outside the casing 21. A cover-plate 27 is fastened to the housing 16 by screws 28 and cooperates with a gasket 29 to seal the opening in the side of casing 16 through which the "Autosyn" is inserted. The housing 16 is supplied with a depending socket 30 whereby the housing may be secured by means of screws 31 to a stud 31a, mounted on the mast of a ship or other suitable support.

The novel means of the present invention comprise means for connecting the rotatable shaft 13 to the rotor of the "Autosyn" transmitter whereby the rotor can be brought gradually up to the speed of the rotating shaft 13 and kept in step therewith. These means comprise a magnetic coil 32 held in place against the bushing 18 by means of a retaining plate 33 and flat head screws 34. A rotatable element comprising a center section 35 of magnetic material surrounded by a concentric ring 36 of non-magnetic material and carrying a concentric ring 37 of magnetic material is mounted on a pin 38 which is driven into an opening concentrically located in shaft 13 for rotation therewith. An armature spaced from the magnetic element is constructed in the form of a disc 39 carrying pins 40 and is loosely mounted on a plate 41 with the pins 40 inserted through openings 42 in said plate. Plate 41 is fastened to a bushing 43 which is connected by screw 44 to the shaft 26 of the "Autosyn" rotor whereby, upon rotation of the disc 39, the plate 41 and the rotor of the "Autosyn" transmitter are rotated.

Upon energization of the coil 32, the magnetic flux will tend to follow the shortest path and will pass from the coil 32 through the shaft 13, pin 38 and center section 35, the air-gap between the rotatable element and the armature, the armature 39, the outer ring 37 and back to coil 32. A magnetic linkage is thereby provided between shaft 13 and the armature 39 whereby the armature is connected by the equivalent of a slipping clutch to the rotatable shaft 13.

Referring to Fig. 2 there is illustrated therein the receiver of the novel wind velocity measuring system and, as shown, comprises a casing 45, enclosing the usual rotor and stator of an "Autosyn" motor, said "Autosyn" being the same as the transmitting "Autosyn." Shaft 45a of the rotor extends outside of the casing 45 which is mounted in operative position in the indicator instrument casing 46 by means of an annular plate 47 held in abutting position with shoulder 48 of casing 46 by screws 48a cooperating with threaded elements 49 in said plate.

An annular plate 50 is mounted within the casing 46 by means of bolt 51 passing through a spacer 52 and fastened in a screw-threaded opening in the ring 53 of casing 45 whereby said casing is held in position on annular plate 47. A nut 54 locks the plate 50 in abutting position with the spacer 52 and locks the casing 45 in position also.

A dial plate 55 is mounted in spaced relation to the plate 50 by means of spacer-bolts 56 and screws 57. A field cup 59 is mounted between shoulder 56a on one of the spacer-bolts and the plate 50 and is held in position by nuts 58 cooperating with lugs 59a on the field cup. A narrow arm 60 is attached to the field cup 59 and carries a bearing 60a adjacent one end thereof in line with the shaft 45a.

A bushing 61 is mounted on shaft 45a by means of a screw 62 and carries thereon for rotation therewith a circular plate 63. A dished element 64 provided with a flange 64a is connected to the bushing 61 and holds the magnetic element 65 in operative position between the plate 63 and flange 64a. The magnet 65 is constructed in the form of a ring with an air-gap, whereby the usual polarities are provided therein.

The drag element cooperating with the magnet 65 is constructed in the form of a metallic cup 66 with a circular opening 66a formed in the bottom thereof and a leg 67 integral with the cup wall, offset therefrom and radial to said opening 66a. The drag element is so located with respect to the magnet that the walls of the cup surround the magnet. Passing through an opening in the leg 67 and fastened thereto by the nut 68, is a bushing 69 fastened to a shaft 70 carrying at one end thereof a pointer 71 movable angularly over the dial plate 55 in the usual manner of indicators, to indicate wind velocity.

An arm 72 is fastened to the field cup 59 and carries the bushing 73 threaded into an opening therein. An adjustable arm 74 is adjustably fastened in position on bushing 73 by nut 75.

A spiral spring 76 surrounding the shaft 70 is attached to said shaft at one end thereof, the other end of said spring being attached to an adjustable arm 74. Shaft 70, carrying the drag element 66, is journalled at one end thereof in the bearing 60a and is journalled adjacent the other end in the bushing 73.

A cover-glass 77 is held in position by a split ring element 78 and seals the open end of the casing 46.

Referring to Fig. 3, there is illustrated therein the wiring diagram of the transmitting and receiving "Autosyns."

Terminals 1T, 2T and 3T at the transmitter are connected to the corresponding terminals 1R, 2R, and 3R at the receiver by the conductors 79, 80 and 81, respectively. Terminals AT and GT are connected with terminals AR and GR by conductors 82 and 83, respectively, and the terminals AR and GR are connected to the low voltage side of a transformer 84, which is connected at the high voltage side to any desirable source of electrical energy such as a 110 volt 60 cycle A. C. source as indicated.

The circuit of the magnetic coil 32 is traced as follows:

Conductor 85 leads from one terminal of the low voltage side of the transformer 84 to switch 86 located preferably adjacent the indicating instrument of the wind velocity measuring and indicating system. A conductor 87 leads from switch 86 to one side of the magnetic coil 32 while the other side of said coil is connected by conductors 83 and 88 to the other terminal of the low voltage side of transformer 84. By closing the switch 86, the magnetic coil 32 is energized to produce flux passing through shaft 13, pin 38, section 35 of the rotatable element, armature 39, outer-section 37 of the rotatable element back to coil 32, whereby armature 39 (see Fig. 1) is magnetically coupled with the shaft 13 to provide a magnetic slipping clutch between the shaft 13 connected to the anemometer cups and the rotor of the transmitting "Autosyn." The transmitting and receiving "Autosyns" are continuously energized even when the switch 86 is open so that the rotors of the two "Autosyns" are kept in perfect synchronism. By opening switch 86 the rotation of the rotors is prevented, since shaft 13 is no longer connected by the magnetic clutch to armature 39, and wear and tear on the "Autosyns" is thereby eliminated during those periods in which no reading is desired, but it is to be specifically noted that the rotors of the transmitting and receiving "Autosyns" are continuously maintained in synchronized position.

The operation of the system is as follows:

Assuming that the "Autosyns" are energized and switch 86 is open, cups 10 are moved by the wind impinging thereon to thereby rotate the arms 11, hub 12 and shaft 13 at a rate proportional to the wind velocity. Rotation of shaft 13 rotates the elements comprising the sections 35, 36, and 37. Since the coil 32 is de-energized there is no magnetic flux linking the shaft 13 and the armature 39. The shaft 13 rotates, therefore, without in any manner affecting the rotor of the transmitting "Autosyn" 21. Since "Autosyns" 21 and 45 are energized, the rotors thereof are stationary but in synchronous relation with each other. When a reading of the wind velocity is desired at the indicator 46, switch 86 is closed to thereby energize the coil 32 whereby flux passes from the coil through shaft 13, pin 38, the inner core 35 of the rotatable element, armature 39, the outer core 37 of the rotatable element and back to the coil 32. Rotation of shaft 13 thereby rotates the armature 39 by means of the magnetic coupling connection which serves as a magnetic clutch, whereby the armature 39 is gradually brought up to the speed of the shaft 13. Armature 39 is connected by pins 40 to the plate 41, whereby the rotation of the armature is conveyed to the plate 41 the rotation of which is transmitted by bushing 43 to shaft 26 of the rotor of the transmitting "Autosyn." The rotation of the "Autosyn" rotor induces currents in the stator by the well-known "Autosyn" principle, which currents are transmitted by conductors 79, 80 and 81, (see Fig. 3) to the receiving "Autosyn" whereby the rotor of the receiver is rotated continuously and in synchronism with the rotor of the transmitter.

Rotation of the receiver rotor rotates shaft 45a (see Fig. 2), bushing 61, plate 63 and dished element 64 to thereby rotate the magnet 65 in synchronism with the transmitting rotor and the shaft 13. Rotation of magnet 65 induces currents in the drag-element 66, whereby the drag element begins to rotate with the rotation of the magnet. Such attempted rotation of drag element 66 partially rotates the shaft 70 whereby a strain is placed upon the spiral spring 76 attached to the adjustable arm 74. The amount of strain placed on the spring at any position of the shaft 70 may be adjusted by adjusting the arm 74. The more rapidly the magnet 65 is rotated, the greater the amount the drag element is rotated in the same direction, which rotation is transmitted to the shaft 70. The spring 76 places a load upon the shaft so that the amount of rotation of shaft 70 becomes proportional to the speed of rotation of the magnet.

Since magnet 65 is rotating at a speed proportional to the speed of rotation of shaft 13 driven by the wind cups, the drag element 66, shaft 70 and pointer 71 are rotated to a position proportional to the wind velocity, so that pointer 71 presents a relatively stationary indication of the value of the wind velocity on the dial 55. The magnetic coupling between the rotor of the receiving "Autosyn" and the shaft 70 provides a simple and reliable means for transforming the continuous rotation of the "Autosyn" rotor to a relatively stationary indication of pointer 71. In this manner, complicated make and break systems of the prior art are replaced by continuously rotating "Autosyns" and the continuous rotation of the "Autosyns" is converted to a relatively stationary indication of the wind velocity by simple and inexpensive means.

When a reading is no longer desired, the switch 86 is opened and the rotors of the "Autosyns" gradually come to rest but in relative positions that are perfectly synchronized and maintained.

Although only one embodiment of the invention has been illustrated and described, various changes and modifications in form, materials, and relative arrangements of parts, which will now appear to those skilled in the art, may be made without departing from the scope of the invention. Reference is, therefore, to be had to the appended claims for a definition of the limits of the invention.

What is claimed is:

1. A wind intensity indicating system comprising a rotating cup anemometer, a shaft connected to said anemometer for rotation therewith, a stationary magnetic coil surrounding said shaft, a source of electrical energy, means for connecting said source to said coil, self-synchronous means comprising a rotor and a stator, a perforated disc connected to said rotor, an armature, a plurality of pins in said armature projecting into said disc perforations, and a magnetizable member mounted for rotation with said shaft adjacent said armature and within the field of said coil.

2. In a device of the character described, a rotating cup anemometer, a shaft connected to said anemometer, a stationary coil surrounding said shaft, a source of electrical energy, means including a switch connecting said source to said coil, a self-synchronous device comprising a rotor and stator, a magnetic armature connected to said rotor for rotation thereby, and means comprising alternate magnetic and non-magnetic sections connected to said shaft in the field of said coil and adjacent said armature whereby, upon energization of said coil, said last-named means and armature are magnetically interlinked to thereby produce rotation of said rotor upon rotation of said shaft.

3. In a device of the character described, a rotating cup anemometer, a shaft connected to said anemometer, a stationary coil surrounding said shaft, control means comprising a rotatable element, an armature connected to said element, means comprising alternate magnetic and non-magnetic sections adjacent said coil and armature and mounted on said shaft for rotation therewith, and means for energizing said coil whereby flux interlinks said means comprising the alternate sections and said armature to provide a magnetic clutch connection between said shaft and said rotatable element.

RALPH R. CHAPPELL.
RUTGER B. COLT.